United States Patent [19]
Bitzer et al.

[11] 3,955,051
[45] May 4, 1976

[54] DATA SET WITH BRIDGE FOR DUPLEX OPERATION

[75] Inventors: Jack J. Bitzer, Santa Cruz; Alton T. Jobes, Jr., Santa Clara, both of Calif.

[73] Assignee: Plantronics, Santa Cruz, Calif.

[22] Filed: Jan. 17, 1975

[21] Appl. No.: 541,783

[52] U.S. Cl. ............................ 179/2 DP; 178/58 R; 333/11
[51] Int. Cl.² .................... H04M 11/00; H04L 5/14
[58] Field of Search ............ 179/2 DP; 178/58, 59, 178/60; 333/11; 343/175, 176, 181

[56] References Cited
UNITED STATES PATENTS

| | | |
|---|---|---|
| 3,226,480 | 12/1965 | Wright et al. .................... 179/2 DP |
| 3,711,660 | 1/1973 | Cherry ................................ 333/11 |
| 3,775,561 | 11/1973 | Guckel .............................. 178/58 R |
| 3,846,582 | 11/1974 | Condon et al. .................. 178/58 R |

*Primary Examiner*—Kathleen H. Claffy
*Assistant Examiner*—George G. Stellar
*Attorney, Agent, or Firm*—Flehr, Hohbach, Test, Albritton & Herbert

[57] ABSTRACT

A data set connecting a data terminal to a data channel for concurrently transmitting and receiving data. Full duplex operation is achieved over the data channel which is typically a two-wire telephone line. In one configuration, a data set receives signals from a computer and transmits frequency shift keyed signals through a telephone central office to a display unit attached to a remote telephone handset. Multifrequency signals from the telephone handset are transmitted over the telephone line to the data set where they are detected, decoded and transmitted to the computer.

13 Claims, 5 Drawing Figures

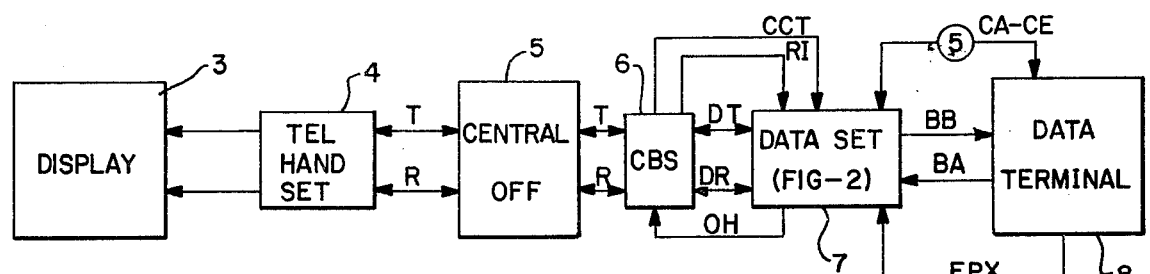
FIG.—1
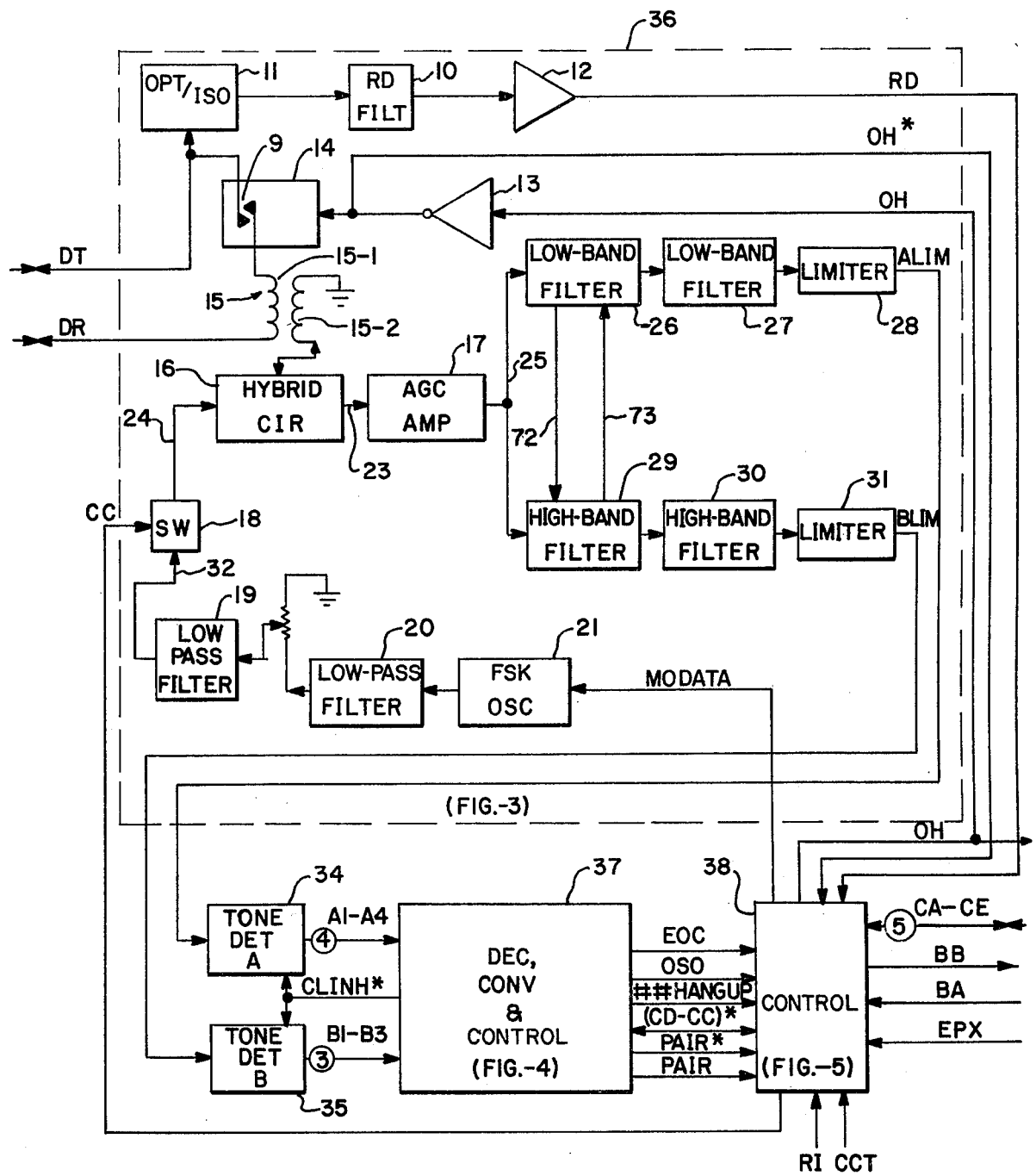
FIG.—2

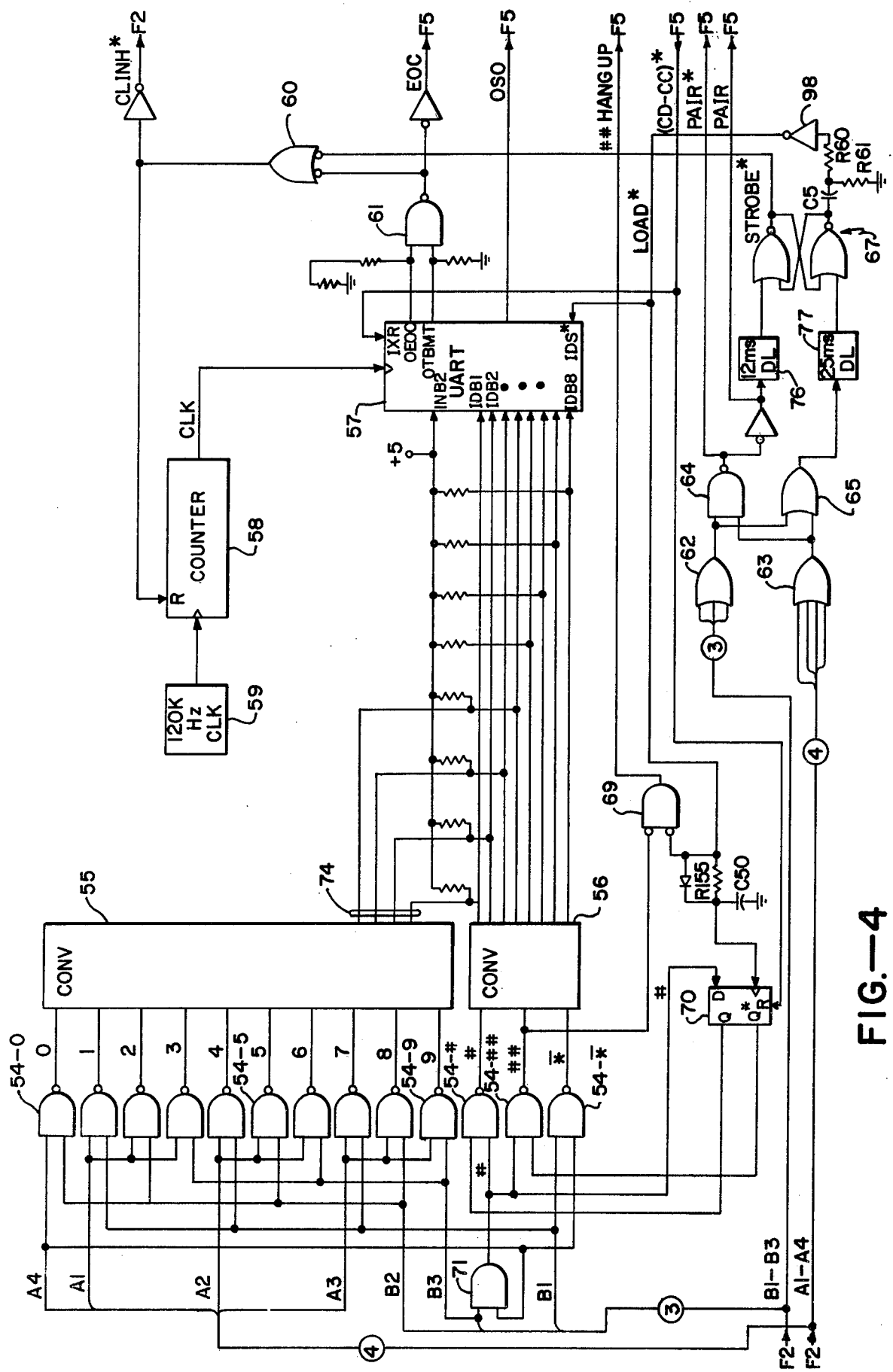
FIG.—4

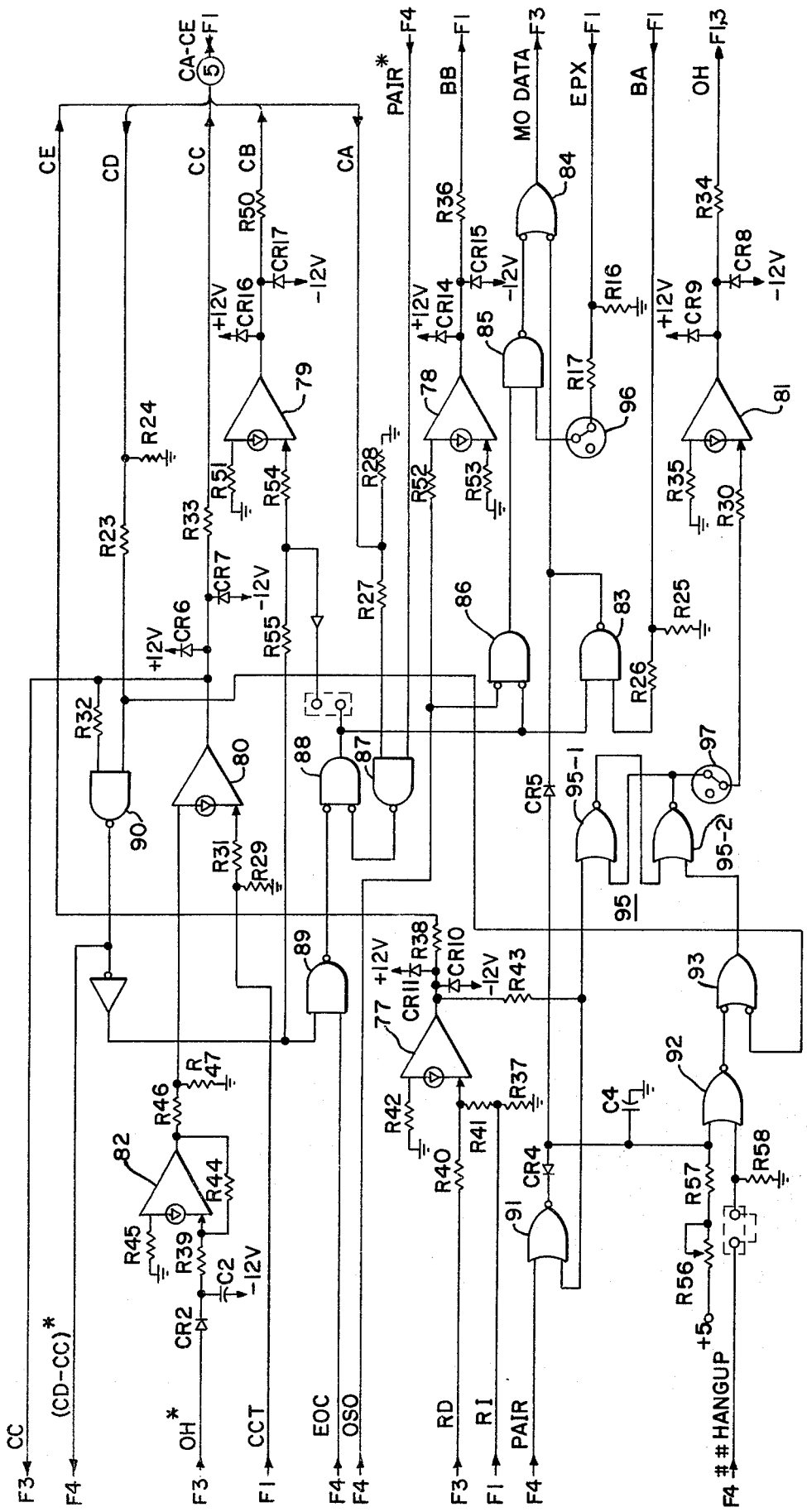
FIG.—5

DATA SET WITH BRIDGE FOR DUPLEX OPERATION

BACKGROUND OF THE INVENTION

The present invention relates to the field of data communication equipment which interfaces between data terminals and data communication channels. Specifically, the invention relates to data sets including circuits in which transmitted signals are isolated from received signals which are carried over the same data channel and which are of the type employed in full duplex operation.

Data sets (sometimes called modems) which are capable of full duplex operation have been known for a long time. One characteristic of data sets which is of particular interest is their ability to distinguish between transmitted signals and received signals carried over the same data channel.

One type of circuit utilized to isolate transmitted signals and received signals has employed inductive or resistive bridge networks. For telephone lines, the networks make a four-wire to two-wire conversion. Specifically, the two-wire connection to the network is the data channel such as the tip and ring lines in a telephone system. The four-wire connection includes two wires for the transmitted signal and two wires for the received signal.

When transmitted signals and received signals are concurrently present on the data channel, the system is operating in full duplex mode. Bridge networks of the type described have not proved entirely satisfactory in that they do not provide adequate isolation between transmitted and received signals. A problem with such bridge networks results because the resistors or other impedances employed have inherent power losses which degrade the efficiency of the networks. For example, the isolation achievable between transmitted and received signals has been of the order of 12 db. Since in the normal operation of telephone circuits losses of up to 28 db are possible inductive or resistive bridge networks have not proved entirely satisfactory. Further, such bridge networks have been dc coupled to the data link and hence are objectionable in environment where direct coupling is prohibited or otherwise undesirable.

Where dc isolation has been desired, dual transformer circuits have been employed to isolate transmitted and received signals. Again, the dual transformer circuits make a four-wire to two-wire conversion of the type employed in full duplex operation. Dual transformer circuits, however, have not provided adequate separation of transmitted and received signals. As a typical example, isolations using dual transformers have been of the order of 20 db or less which is not adequate in telephone circuits where losses of up to 28 db are normally present.

In order to obtain better isolation between transmitted and received signals, an operational amplifier circuit which achieves a four-wire to two-wire conversion has been employed for full duplex operation. Although, such a network has achieved isolation improvements over prior techniques, still additional isolation between transmitted and received signals is desirable.

Accordingly, it is an objective of the present invention to provide an improved data set which provides greater isolation between transmitted and received signals.

SUMMARY OF THE INVENTION

The present invention relates to data communication equipment including a data terminal for transmitting and receiving data, a data channel for connecting the transmitted and received data to remote equipment and a data set for connecting the data channel to the data terminal.

In accordance with the present invention, the data set includes a hybrid circuit which isolates signals transmitted over and signals received from the data channel. The hybrid circuit includes a first amplifier which inputs a signal to be transmitted over the data channel to the hybrid circuit while maintaining that signal isolated from the received signal. The second amplifier is responsive to the signals on the data channel to detect a received signal and isolate it from transmitted signals on the data channel. Means are provided for connecting the transmitted signal output from the second amplifier along first and second symmetrical paths to subtracting inputs of the second amplifier. These symmetrical paths conduct components of the transmitted signal which are of equal phase and magnitude to the subtracting inputs of the second amplifier and hence the transmitted signal components tend to be canceled. Means are also provided for connecting components of the received signal from the data channel along asymmetrical paths to the subtracting inputs of the second amplifier. The asymmetrical paths cause the received signal components to be of unequal amplitude so that the received signals are not canceled and so that the output from the second amplifier is the received signal isolated from the transmitted signal.

In one embodiment, the hybrid circuit includes a bridge circuit. A first leg of the bridge connects from the output of the first amplifier through a first leg to a common point connected to the data channel. From the common point, the transmitted signal is output over the data channel. A second leg of the bridge circuit connects from the common point to one of the two inputs of the second amplifier. A third leg of the bridge circuit connects from the output of the first amplifier to a reference point. A fourth leg of the bridge circuit connects from the third leg to the second input of the second amplifier. The first and second inputs of the second amplifier are of opposite polarity thereby causing signals of equal magnitude and phase to be canceled. The first and second legs of the bridge circuit form one path for conducting transmitted signals from the output of the first amplifier to one input of the second amplifier. The third and fourth legs provide a second path for conducting transmitted signals from the output of the first amplifier to a second input of the second amplifier. The first and second paths are of equal impedance so that the effects of transmitted signals tend to be canceled within the second amplifier. Received signals from the data channel are connected from the common point through the first leg and the third leg to the reference point. The first and third legs therefore act as a voltage divider for the received signal. The second and fourth legs connect at different points in the voltage divider so that components of the received signal having a different amplitude are input to the second amplifier. Since the inputs are of different amplitude, the components of the received signal on the inputs of the second amplifier do not cancel and hence, the output from the second amplifier is the received signal.

In accordance with one embodiment of the present invention, the transmitted signal is a frequency shift keyed signal. In accordance with another embodiment of the present invention, the received signal is an encoded multifrequency signal.

In accordance with another embodiment of the present invention, a frequency detector for detecting bands of signals in the multifrequency received signal includes circuits having negative cross-coupling for providing sharp cutoff between adjacent frequency bands. In one embodiment the received signal output from the hydrid circuit is filtered to detect low-band frequencies and to detect high-band frequencies. A low-band filter and a high-band filter are provided with negative cross-coupling to insure a sharp cutoff between the low-band and high-band frequencies.

In accordance with another embodiment of the present invention, the hybrid circuit for isolating transmitted and received signals is transformer coupled to tip and ring telephone lines which in turn connect to a handset and to a display device. The hybrid circuit also connects through the data set to a computer whereby the computer can send commands to the display device and the handset can send signals to the computer. Signals from data set to display are typically frequency shift keyed. Signals from the handset to the data set are typically frequency encoded. The frequency encoded and frequency shift keyed signals are simultaneously present on the telephone line in full duplex operation.

In accordance with the above summary, the present invention achieves the objective of providing an improved communication apparatus capable of providing high isolation between transmitted and received signals over a common data channel.

Additional objects and features of the invention will appear from the following description in which preferred embodiments of the invention have been set forth in detail in conjunction with the drawings.

DRAWINGS

FIG. 1 depicts a schematic block diagram of a data set connecting a data terminal to a telephone line where the telephone line connects from a central office to a telephone handset and a handset display.

FIG. 2 depicts a block diagram of the data set utilized within the FIG. 1 apparatus.

FIG. 4 depicts a schematic representation of a second part of the data set of FIG. 2.

FIG. 5 depicts a schematic representation of a third part of the data set of FIG. 2.

DETAILED DESCRIPTION

Figure 3:
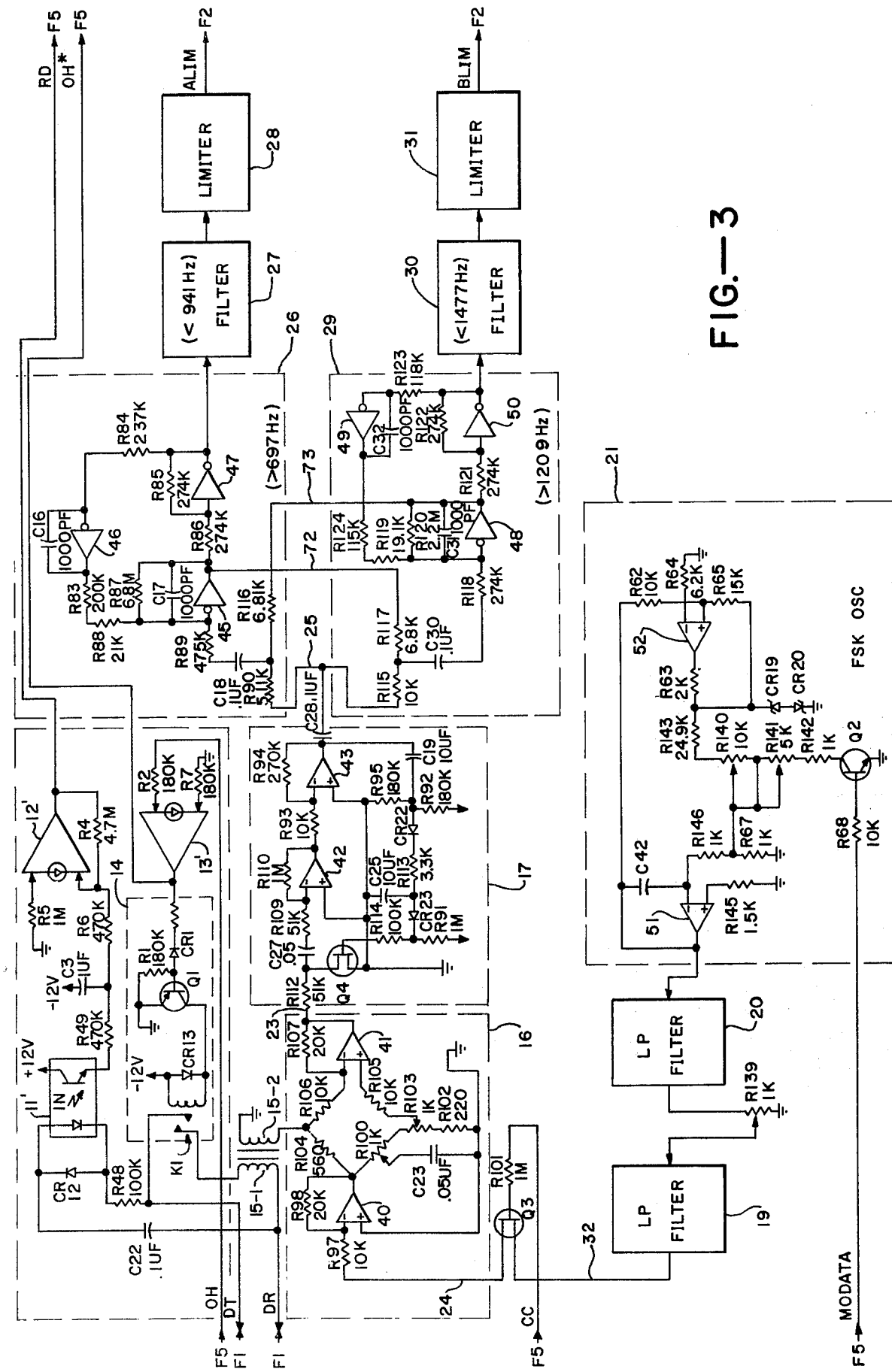
FIG. 3 depicts a schematic representation of a first part of the data set of FIG. 2.

In FIG. 1, the data set 7 transfers data to and from data terminal 8 over data lines BA and BB and transfers data from and to a data channel which connects to a telephone central office 5. The CBS equipment 6 is provided at the central office 5, in a conventional manner, to provide connection to the data channel over data tip (DT) and data ring (DR) lines. The DT and DR lines in turn are coupled to conventional telephone tip (T) and ring (R) lines which connect to a conventional handset 4.

The control signals are received at the data set 7 from the CBS equipment 6 of the central office 5. The CCT signal indicates when the DT and DR lines are connected to the T and R lines, respectively. The RI signal is a ring indicator for indicating when a ring signal is present on the tip and ring lines to ring the telephone handset 4. The data set 7 also connects with control signals to the data terminal 8. The five control lines CA–CE include the lines CA, CB, CC, CD and CE which function in a manner hereinafter described. The data set 7 also outputs an offhook (OH) line to the CBS equipment 6 and receives back an echoplex (EPX) line from data terminal 8.

In FIG. 1, the T and R lines of the data channel connect to the telephone handset 4 in a conventional manner. Within the telephone handset, the T and R lines from the central office 5 are isolated and coupled to a microphone. The display 3 connects from the lines at the microphone and carries the signal on the T and R lines. The handset 4 is, in a preferred embodiment, a conventional device of the type including push-button, multifrequency tone generators. Information from the data terminal 8 is encoded as frequency shift keyed signals in the data set and is transmitted over the data channel for display on display 3. Information, generated via the multitone push-buttons of the handset 4, is transmitted as an encoded multifrequency signal along the data channel to the data set 7 where it is converted and input to the data terminal 8. While frequency shift keyed signals are transmitted over the channel from the data set to the display 3 and encoded multifrequency signals are transmitted from handset 4 to the data set 7, many different types of modulation may be employed in accordance with the present invention. For example, frequency shift keyed transmission may be employed in both directions. Similarly, multifrequency signals may be employed in both directions. Any signal suitable for transmission over conventional telephone bands of 300 to 3 KHz may be employed. Other examples are continuous wave modulation such as employed in Morse code and phase-shift keyed signals. Of course, other types of modulation suitable for use in the present invention will be apparent to those skilled in the art.

DATA SET — FIG. 2

In FIG. 2, the data set 7 of FIG. 1 is shown in further detail. The data set of FIG. 2 receives and transmits over the channel via the data tip (DT) line and the data ring (DR) line. Similarly, the data set of FIG. 2 transmits digital data, to the data terminal 8 of FIG. 1, via the output line BB and receives data via the input line BA. The ring indicator (RI) line and the circuit connected (CCT) line are each received for control purposes as input to the control 38. Similarly, the 5-line control bus CA–CE connects to the control 38 for interfacing with the data terminal 8 of FIG. 1. The ECHOPLEX (EPX) line and the offhook (OH) line also connect to control 38. The DR line is input through a switch 14 for connection to one winding 15-1 of a transformer 15. Switch 14 can be any switch but typically includes relay actuated contacts 9 which open or close the DT line in response to a control from the off-hook amplifier 13. The signal on the DT line is also connected through an optical isolator (OPT/ISO) 11 to a ring detect filter (RD FILT) 10. Filter 10 is typically a low pass filter with a cutoff selected to detect the 20Hz ring signal. When a 20Hz signal is detected on the DT line, filter 10 provides an output to amplifier 12 which energizes the RD line as a logical 1. The logical 1 for the RD signal is input to the control 38. Whenever an offhook condition exists, the OH line is a logical 1 and is input through amplifier 13 to close contact 9 and provide OH* as a 0. When contact 9 is closed, the DT channel line is connected to winding 15-1. The transformer 15 includes a second winding 15-2 which is connected between ground and as an input to and an output from the hybrid circuit 16. Hybrid circuit 16 functions to isolate transmitted signals going out over the data channel from winding 15-2 to winding 15-1 and receives signals coming over the channel from winding 15-1 to winding 15-2. Transmitted signals are received on input line 25 from the switch 18. Received signals are output from hybrid circuit 16 on line 23 to the automatic gain control amplifier (AGC AMP) 17. The detected signal as amplified in amplifier 17 appears as a multifrequency signal on line 25. The frequencies within the line 25 signal include a low band between approximately 697 and 941 Hz and a high band between approximately 1209 and 1477Hz. The low-band frequencies are detected by the circuits 26, 27 and 28 and high band signals are detected by the circuits 29, 30 and 31.

In the low band path, low band filter 26 has a cutoff frequency to pass signals greater than 697Hz and filter 27 has a cutoff for passing signals of less than approximately 941Hz. Limiter 28 functions to establish the signal amplitude at a convenient level all in a conventional manner. The output signal ALIM includes signals in the band from 697 to 941Hz.

In the high band path, the filters 29 and 30 function to pass signals greater than approximately 1209 and less than approximately 1477Hz. The signals within the 1209 to 1477Hz band are appropriately amplitude limited in circuit 31 and appear as the BLIM signal. The ALIM and BLIM signals from the limiters 28 and 31 are input to the A tone detector 34 and the B tone detector 35, respectively. Tone detectors 34 and 35 are devices for detecting a plurality of preselected frequencies within the input signals. Specifically, the A tone detector 34 receives the multifrequency signal ALIM and detects the presence or absence of the frequencies 697, 770, 852 and 941 and responsively generates the binary signals A1, A2, A3 and A4, respectively. In a similar manner the B tone detector 35 detects the signal frequencies 1209, 1336 and 1477 within the multifrequency signal BLIM and responsively generates the binary signals B1, B2 and B3, respectively. The detectors 34 and 35 include output gates which inhibit any of the binary signals A1 through A4 and B1 through B3 whenever a logical 0 is present for the CLKINH* signal from the control of circuit 37. The A and B binary signals, A1 through A4 and B1 through B3, signify which of the frequencies have been detected on the data channel. Those binary signals are input to the decoder, converter and control 37.

The A and B signals in circuit 37 are decoded in a conventional manner to represent the numbers 0, 1, . . . , 9 and the symbols #, # #, and ⁕. After being decoded, the numbers and symbols are converted and encoded into a standard ASCII code. Thereafter, the encoded ASCII values are converted from parallel form to serial form and output serially-by-bit on the data line to OSO for input to the control 38. The circuit 37 receives a control signal (CD-CC)* which as a 1 inhibits operation of the circuit 37. Within the symbol (CD-CC)*, the CC symbol designates that the data set is ready and the CD symbol indicates that the data terminal is ready. When both are ready, the (CD-CC)* is a 0 permitting operation of the circuit 37.

Circuit 37 also outputs the EOC control signal for indicating the end of a character, a PAIR control signal and its complement PAIR* for indicating the presence of both one of the A signals A1 through A4 and one of the B signals B1 through B3. Circuit 37 also provides the # # HANGUP control signal which indicates when the telephone handset 4 of FIG. 1 has had the # push-button switch actuated twice in rapid succession.

The control 38 of FIG. 2 receives the digital data on line OSO and outputs it to the data terminal 8 of FIG. 1 over the data line BB. In a similar manner, the control 38 receives digital data on the line BA from data terminal 8 of FIG. 1 and outputs it over the MODATA line to the oscillator 21. The data received on line OSO and output on line BB is the received data which appeared on the data channel lines DT and DR as multifrequency signals. The data on lines BA and MODATA is the transmitted data which is to be transmitted on the data channel lines DT and DR with frequency shift keyed modulation. Further details of the data set of FIG. 2 are described in FIGS. 3, 4 and 5.

The signal to be transmitted is input to the hybrid circuit 16 on line 24 whenever the switch 18 is closed by an operation of the CC signal which signifies that the data set is ready. The transmitted signal through switch 18 is derived from the low pass filters 19 and 20 which pass the output signal from the frequency shift keyed oscillator (FSK OSC) 21. Oscillator 21 and filters 19 and 20 function to output on line 32 a signal of either 2025Hz to indicate a space or of 2225Hz to indicate a mark. A mark frequency occurs whenever the signal MODATA is 1 and a space signal occurs whenever the MODATA signal is a 0. The MODATA signal is derived from control 38.

DATA SET — FIG. 3

In FIG. 3, the portion of the data set of FIG. 2 shown within the broken line 36 is depicted. In FIG. 3, the data channel includes the DT and DR lines which derive from the CBS equipment 6 in FIG. 1. The data channel connects to the transformer winding 15-1 through the contact K1 in the switch 14. The switch 14 is a conventional relay operated device including a contact K1 which operates when closed to connect the line DT to the winding 15-1. Contact K1 is closed by operation of a relay coil. The coil is connected to −12 volts on one side and in parallel with a diode CR13 is connected to the collector of a transistor Q1. Whenever transistor Q1 is conducting, current flows through the coil to close the contact K1. Transistor Q1 is connected through a diode CR1 to the output of a current amplifier 13′. Amplifier 13′, like the other current amplifier used throughout the application is typically a model 3900 manufactured by National Semiconductor. Amplifier 13′ is responsive to produce an output which causes contact K1 to close whenever the offhook (OH) signal on its input is a logical 1. Amplifier 13′ acts as a buffer between the logic circuits and the relay of switch 14.

The data channel including the DR and DT lines are input to the optical isolator 11′. Optical isolator 11′ isolates and conducts the signal on the data channel as an input to a low pass filter which includes the 470K resistors R49 and R6 together with the 1 microfarad capacitor C3. The low pass filter detects a 20Hz signal which, when present on the data channel, represents the ring signal. Upon detection of a 20Hz signal on the data channel, an output is provided from the current amplifier 12' which produces the RD line as a logical 1. Whenever the 20Hz signal is not present, the RD line is a logical 0. Also, the output from amplifier 13' is the signal OH* which is the inversion of the input OH.

When the contact K1 is closed, the data channel is connected through the winding 15-1 to the winding 15-2 which connects as an input to the hybrid circuit 16. Winding 15-2 connects from ground on one side to a common point in a bridge network. The bridge network includes a first leg in the form of resistor R104 and a second leg in the form of resistor R106. The first leg R104 connects from the output of a first differential amplifier 40 and the second leg R106 connects to the negative input of a second amplifier 41. The amplifiers 40 and 41 are conventional operational amplifiers. Amplifier 40 is connected with a 10K input resistor R97 and a 20K feedback resistor R98. Amplifier 41 is connected with a 10K input resistor R106 and a 20K feedback resistor R107.

The input amplifier 40 is utilized to introduce from line 24 signals to be transmitted over the channel and the output amplifier 41 is utilized to produce on line 23 signals received from the channel. The signal to be transmitted on line 24 is isolated from the received signal on line 23 by operation of the hybrid circuit 16.

The second and positive input to the first amplifier 40 is connected to the reference which is ground. The output from the first amplifier connects along a third leg including 1K resistor R100, 0.05 microfarad capacitor C23, a portion of 1K resistor R103 through to 220 ohm resistor R102 to ground. A fourth leg of the bridge includes the resistor R105 which is connected to the variable tap of 1K resistor R103 to the second and positive input of the second amplifier 41.

The hybrid circuit 16 for transmission conducts signals from line 24 to the output of first amplifier 40. From the output of the first amplifier 40, a signal to be transmitted is conducted through the first leg resistor R104 to the common point and to the winding 15-2 where it is coupled to the winding 15-1 and out over the data channel on the DR and DT lines. A component of the signal to be transmitted from the output of the first amplifier 40 is also connected along the third leg through resistor R100 and the variable tap which connects through capacitor C23 and resistors R103 and R102 to ground. The variable tap on resistor R103 provides an input signal along the fourth leg, which is resistor R105, to the positive input of the second amplifier 41. At the same time, another component of the signal to be transmitted is conducted from the output of amplifier 40 through resistor R104 to the common point and from there through the second leg, which is resistor R106, to the negative input of amplifier 41. The components of the signal to be transmitted input to amplifier 41 tend to cancel each other so that no component of the signal to be transmitted appears on line 23 output from amplifier 41. The resistor R103 tap is adjustable to insure that the amplitudes of the signal to be transmitted components, appearing on the plug and minus inputs of amplifier 41, are of equal amplitude and hence cancel each other. The resistor R100 tap through capacitor C23 is provided to cancel the capacitive effects of the transmission line as reflected through the transformer windings 15-1 and 15-2. The R100 tap is adjustable to insure that the signal to be transmitted components at the input to amplifier 41 are of the same phase.

During reception, a received signal on the data channel is coupled from winding 15-1 to winding 15-2 and is input to the hybrid circuit at the common point between the resistors R104 and R106. The received signal from winding 15-2 is conducted through resistor R104 to the output of amplifier 40 which is a virtual ground. The voltage due to the received signal at the common point between resistors R104 and R106 is input through resistor R106 (second leg) to the negative input of the second amplifier 41. Although a second component of the received signal is theoretically conducted through resistors R100 and R105 (fourth leg) to the positive input of amplifier 41, that second component is very small compared to the first component and hence can be ignored. Since the first component signal at the negative input is of much greater amplitude than the second component signal at the positive input of amplifier 41, the components do not cancel and the output on line 23 is proportional to the received signal.

The output of amplifier 40 appears as a virtual ground with respect to the received signal conducted from winding 15-2 through resistor R104 and hence the received signal does not couple to input line 24. Amplifier 40, therefore maintains the signal to be transmitted isolated from the detected signal which appears at the output of amplifier 40.

In FIG. 3, the detected signal on line 23 output from the hybrid circuit 16 is input to any conventional automatic gain control amplifier 17. Amplifier 17 includes two operational amplifiers 42 and 43 which amplify the signal on line 23 to produce an output through coupling capacitor C28 on line 25. The output of amplifier 43 is coupled back through appropriate networks to inputs of amplifiers 42 and 43 to provide positive feedback which subtracts from the negative input and thereby automatically controls the gain of amplifier 17. The field-effect transistor Q4 receives a feedback signal to reduce the input signal by conducting to ground whenever an input signal of too great an amplitude is received.

In FIG. 3, the detected signal on line 25 is input to the low band filter 26 and to the high band filter 29. The low band filter 26 is selected to have a cut off frequency to pass signals greater than 697Hz. The input signal on line 25 connects through the 5.11K resistor R90 through the coupling capacitor C18 to the 475K resistor R89. The frequency response of filter 26 is established by the 1000 picofarad capacitors C16 and C17 in combination with the resistors R83 through R89 and the inverters 45, 46 and 47. The output from inverter 45 cross-couples a signal having frequencies greater than 697Hz via line 72 to the filter 29. In a similar manner, a signal having frequencies of greater of 1209Hz is cross-coupled via line 73 from filter 29 to filter 26. The cross-coupled signal on line 73 is input through resistor R116 to the coupling capacitor C18 where it tends to subtract from any signal of like frequencies from resistor R90. This negative cross-coupling in filter 26 tends to reduce the effects of frequencies greater than 1209 Hz within filter 26 and hence provides a notch between the frequencies 1209Hz and 697Hz which is sharply defined.

The filter 29 is analoguous to the filter 26. Specifically, the received signal on line 25 is input to the filter 29 through the 10K resistor R115 where it is summed with the negative cross-coupled signal on line 72 from the resistor R117. The received signal and the negative cross-coupled signal are input through the coupling capacitor C30 to the 274K resistor R118. Frequency characteristics of the filter 29 are established by the 1000 picofarad capacitors C31 and C32, the resistors R118 through R124, and the inverters 48, 49 and 50. The negative cross-coupled signal on line 72 insures that frequencies greater than 697Kz (but substantially less than 1209Hz) are canceled in filter 29 hence providing sharp elemination of the 697Hz frequency in the filter 29.

The signals greater than 697Hz output from the filter 26 are input to conventional filter 27 which further filters to pass only signals less than 941Hz. The operation of filters 26 and 27 and the limiter 28 provides the ALIM signal as previously described in connection with FIG. 2.

In a similar manner, the signals greater than 1209Hz output from the filter 29 are further filtered in the conventional filter 30 which passes the signals less than 1477Hz. The operation of the filters 29 and 30 and the limiter 31 provide the BLIM signal as previously described in connection with FIG. 2.

In FIG. 3, a field effect transistor Q3 is turned on in response to a logical 1 for the CC signal conducted through resistor R101. When CC is 0, transistor Q3 is turned off thereby inhibiting the signal to be transmitted from being input on line 24 to the hybrid circuit 16. A signal to be transmitted is generated on line 32 and input to transistor Q3 from a loq pass filter 19. Filter 19 is a conventional device which operates to pass sine wave signals of a frequency of 2025Hz or 2225Hz. Signals of frequency 2025Hz represent a space and signals of frequency 2225Hz represent a mark in frequency shift keyed modulation. The generation of a mark or space at those frequencies is carried out as a function of the 1 or 0 logic level, respectively, of the signal on the MODATA line. The MODATA signal is input to the frequency shift keyed oscillator (FSK OSC) 21. Oscillator 21 has a transistor Q2 which is turned on with respect to a logical 1 and turned off with respect to a logical 0 on the MODATA line. The on or off condition of the transistor Q2 functions to change the oscillation frequency established by the schmit trigger oscillator 52. When a logical 1 is input to cause transistor Q2 to conduct, schmit trigger oscillator 52 oscillates to produce a triangular wave output from amplifier 51 at the 2225Hz frequency. When transistor Q2 is off, the frequency is reduced to 2025Hz as a triangular wave output from amplifier 51. Low pass filter 20 operates in a conventional manner to pull out the odd harmonics from the triangular waveform and to provide a filtered signal as an input to filter 19 through the level setting variable resistor R139. When passed by transistor Q3, the mark and space signals on line 32 appear on line 24 as an input to the first amplifier 40 of the hybrid circuit 16.

DECODER CONVERTER AND CONTROL — FIG. 4

In FIG. 4, the decoder, converter and control 37 depicted within the data set of FIG. 2 is shown. In FIG. 4, the four signal lines A1–A4 represent the four low-band binary (1 or 0) signals which are detected in the A tone detector 34 of FIG. 2 in response the low-band ALIM signal output from the circuit of FIG. 3. In a similar manner, the three B1–B3 lines carry the three binary (1 or 0) high-band signals B1, B2 and B3 which are detected by the B tone detector 35 in FIG. 2 through filtering of the BLIM signal output from the apparatus of FIG. 3. The four low-band signals are input to the decoders 54-0 through 54-9 to decode the numerics 0, 1, 2, . . . 9. By way of example, the two input NAND gate 54-0 receives the A4 and the B2 signals for decoding the numeric 0 whenever A4 and B2 are both logical 1's. In a similar manner, the NAND gate 54-5 receives the A2 and the B2 signals to decode the numeric 5 whenever A2 and B2 are 1's.

In addition to the numerics, the NAND gates 54-#, 54-## and 54-*are provided to decode three additional symbols. The NAND gate 54-# decodes the first occurrence of a # signal as a decode of the B3 and A4 signals as provided in AND gate 71 provided that the conventional D-type flip-flop 70 has not been clocked to provide a 0 on its Q output. The output from gate 71 is essentially an indication that the cradle switch on the telephone handset 4 of FIG. 1 has been actuated once such as occurs when the telephone initially goes offhook. With the offhook condition, gate 71 provides a logical 1 at the D input of flip-flop 70. Thereafter, when flip-flop 70 is clocked by an operation of a transition for the LOAD* signal, as delayed through resistor R154 and capacitor C50, flip-flop 70 is switched to provide a 1 on its Q output and a 0 on its Q* output inhibiting any output from gate 54-# while providing an output from flip-flop 54-##.

The outputs from the numeric NAND gates 54-0 through 54-9 are input to converter 55. Converter 55 is a conventional device for converting the 1 out of 10 input code to a conventional ASCII code on the four output lines 74. In a similar manner, the symbol NAND gates 54-#, 54-## and 54*are each input to a conventional converter 56 which similarly converts the 1 out of 3 input codes to a standard ASCII output code. The outputs from conventional converters 55 and 56 are OR'ed to provide an input to the universal asynchronous receiver/transmitter (UART) 57. The UART 57 is any conventional device and in one typical embodiment is model 1757 manufactured by American Micro Systems (AMS).

The UART 57 functions to receive the parallel inputs from converters 55 and 56 on inputs IDB1 through IDB8. Information is stored from the parallel inputs under the command of a 0 for the LOAD* signal. After being loaded in the UART 57, the data is serially counted out, by operation of the CLK signal from counter 58, on the serial-by-bit line OSO. Counter 58 is a conventional device which provides a count down of the 120KHz clock signals from a conventional clock 59. After data has been serially stepped out on the OSO line, an end of character (EOC) signal is propagated through NAND gate 61, when the OTBMT signal is 1, and through gate 60 to reset the counter 58 and when inverted to provide the CLINH* signal as a 0. The UART storage is reset by operation of a (CD-CC)* signal, occurring for each new data set to data terminal hook-up, connected to the IXR input of UART 57.

The UART of FIG. 4 is controlled by operation of the latch 67 and other apparatus in FIG. 4. Latch 67 is set by operation of the output NAND gate 64 and is reset by operation of the output OR gate 65. Gates 64 and 65 are satisfied by the output of OR gates 62 and 63. Gate 62 functions to detect the presence of at least one of the three signals B1 through B3. Similarly, the OR gate 63 functions to detect the presence of at least one of the four signals A1 through A4. The presence of at least one of the B signals and at least one of the A signals provides a 0 output from NAND gate 64 which is the PAIR* signal and when inverted is the PAIR signal. The inputs to gates 62 and 63 are present as 1's only when the CLINH* signal is a 1. The CLINH* signal connects from FIG. 4 as an input to the tone detectors 34 and 35 in FIG. 2. As previously described, the CLINH* signal when 0 functions to inhibit outputs from the detectors 34 and 35.

Under initial conditions, the CLINH* signal is normally a 1. It is a 1 because the output from NAND gate 60 is initially a 0 since the STROBE* signal output from the latch 67 is initially a 1 and the output of gate 61 is initially a 1. With the CLINH* output a 1, input signals are propagated on the buses B1–B3 and A1–A4 to the gates 62 and 63. When NAND gate 64 detects the presence of two 1's on its input, it produces a 0 output which is inverted and thereafter delayed for 12 milliseconds in the delay 76. After the delay of delay 76, the latch 67 is set causing the STROBE* signal to go to 0. The 0 from latch 67 forces the output of gate 60 to a 1 which at this time resets and holds reset counter 58. At the same time, the CLINH* signal goes to a 0 inhibiting further inputs to gates 62 and 63. After the STROBE* signal goes to 0, the LOAD* signal also goes to 0 with a short delay caused by pulse-forming capacitor C5, resistors R61 and R60. A 0 LOAD* signal is input to UART 57 causing the parallel data to be loaded from converters 55 and 56.

At the same time that the 12 millisecond delay 76 received an input signal, OR gate 65 also provided a signal to initiate the 25 millisecond delay 77. The 25 millisecond delay allows the LOAD* signal to load the parallel data into the UART 57 before the STROBE* signal is removed to initiate unloading of the data. At the start of the LOAD* signal, the EOC signal is forced to a 0 while the OTBMT signal is forced to a 1 so that the output from NAND gate 61 remains a 1.

After the 25 millisecond delay of delay 77; latch 67 is reset causing the STROBE* signal to be a 1. That 1 plus the 1 from gate 61 forces the output of NAND gate 60 to a 0 thereby enabling the counter 58 to begin counting and step out the data in UART 57 serially-by-bit on the OSO line. After the data has been stepped out, the end of character signal EOC is switched to a 1 thereby forcing the output of gate 61 to a 0 which through gate 60 is inverted to a 1 which inhibits counter 58 from further counting. Thereafter the OTBMT signal switches to 0 forcing the output from gate 61 to 1, causing the CLINH* signal to be 1.

CONTROL — FIG. 5

In FIG. 5, the serial-by-bit data on the OSO line, resulting from received data on the data channel, is connected as an input to current amplifier 78. Amplifier 78 is a buffer which connects the OSO line data as an output on the BB line which in turn connects as the data input to the data terminal 8 of FIG. 1.

Data from the data terminal 8 of FIG. 1 appears on the BA line input to the FIG. 5 circuitry. The BA line connects data to be transmitted as an input to the NAND gate 83. From gate 83, the data to be transmitted is connected through the NAND gate 84 to the MODATA line which in turn is connected to the FSK oscillator 21 of FIG. 2. The MODATA signal becomes frequency shift keyed modulated to provide the signal to be transmitted on line 24 which is output through the hybrid circuit 16 of FIG. 2 to the data channel.

In FIG. 5, NAND gate 86 connects the serial-by-bit data on the OSO line as an input to the NAND gate 85. When NAND gate 85 is enabled by an output from switch 96, the OSO received data can be output on the MODATA line as the data to be transmitted. Control of gate 85 is by the echoplex signal (EPX). Whenever the switch 96 is closed, in the position shown, and the EPX signal is 1, gate 85 is enabled to place the OSO data on the MODATA line. This echoplex operation has the effect of taking the received data from the data channel and having it to retransmitted over the data channel.

In FIG. 5, the ring detect signal RD is received from the circuit of FIG. 3 and input to the current amplifier 77. Also the ring indicator signal RI provided from the CBS equipment 6 of FIG. 1 is input to amplifier 77. When the RI signal is provided from CBS equipment, the RI signal overrides the RD signal. When either the RD or RI signal is a 1 to indicate a ring signal on the data channel, amplifier 77 provides an output which provides the CE signal, to the data terminal, and an input to set latch 95. With switch 97 in the position shown, the output from latch 95 through buffer 81 provides the offhook signal (OH). The output from amplifier 77 also provides an input to gate 91. Gate 91 provides an output whenever either the ring signal is detected by buffer 77 or the PAIR signal from FIG. 4 is present. A 0 output from gate 91 inhibits any data to be transmitted from being output from NAND gate 84. The absence of a PAIR signal or a RD or RI signal causes the output of gate 91 to be 1, which enables gate 84 and through NOR gate 92 and NAND gate 93 resets latch 95 to force the OH signal to 0. Latch 95 is reset also by a # # HANGUP 1 signal from FIG. 4 or if the data terminal is not ready as indicated by a CD 0 signal.

In FIG. 5, the 5-line CA–CE bus carries the five signals CA, CB, CC, CD and CE. These signals are, for convenience, utilized in accordance with the Electronic Industries Association standard RS-232-C for defining the interface between data terminal equipment and data communication equipment employing serial/binary data interchange. In that standard the CA signal is a request-to-send signal. CB is a clear-to-send signal. CC is a data set ready signal. CD is a data terminal ready signal and CE is a ring indicator signal.

The CD signal indicating that the data terminal is ready is input to NAND gate 93 as previously described and to NAND gate 90. Provided an offhook condition is indicated through amplifiers 82 and 80 in response to the OH* signal at a time when the CBS equipment is connected to the data channel as indicated by the CCT signal, amplifier 80 produces an output which enables the other input of NAND gate 90 with a 1. With gate 90 satisfied with two 1's, an an input 1 is provided to NAND gate 89. Gate 89, when EOC is 1, produces a 0 which forces the output of NAND gate 88 to 1 which enables gate 83 and inhibits gate 86. Under these conditions, the gate 83 provides the data on the BA line as an input through gate 84 for output on the MODATA line as previously described. Under the output from gate 88 is 0, gate 83 is inhibited while gate 86 is enabled. When enabled, gate 86 connects the OSO data through gate 85 (if enabled by EPX) the gate 84 to the MODATA line as previously explained.

The CC data set ready signal is generated as the output from amplifier 80 and occurs whenever an offhook condition exists provided by a 0 for the OH* signal from FIG. 3 and a 1 for the CCT signal from FIG. 1 are present.

The CB clear-to-send signal is generated as an input from the amplifier 79 which functions to buffer the inverted output of AND gate 90.

The CA request-to-send signal is input to NAND gate 87 which in turn functions to enable the NAND gate 88 to in turn enable one of the data gates 83 and 86 which function to connect either the OSO or the BA data lines to the MODATA output data line.

What is claimed is:

1. Data communication apparatus including a data terminal for transmitting and receiving digital data, a data set connected to the data terminal, a telephone central office connected to the data set, a telephone line data channel connected to the central office, a telephone handset connected to the data channel for generating an encoded multifrequency signal, and a display connected to the telephone handset for displaying frequency shift keyed information wherein said data set is responsive to the data terminal to form a signal to be transmitted over the data channel to said display and wherein said data set is responsive to signals received over the data channel from said telephone handset, said data set comprising, generator means for generating a signal to be transmitted as a frequency shift keyed signal in response to digital information from said data terminal, first amplifier means responsive to said signal to be transmitted for providing an output for providing a signal to be transmitted over the data channel and for isolating the signal to be transmitted from a signal received from the data channel, second amplifier means having first and second differential inputs and having an output, network means including, first, second, third and fourth legs where said first and second legs are connected in series from said output of said first amplifier means to said first input of said second amplifier means, where said third and fourth legs are connected in series from said output of said first amplifier means to said second input of said second amplifier means, connection means for connecting said data channel, having a channel impedance, to said network means at a point between said first and second legs, balancing means including a resistance and a capacitive reactance, forming a balancing impedance equal to said channel impedance, for connecting a reference to said network means at a point between said third and fourth legs, said first and second legs, as coupled by said channel impedance, conducting a first component of said signal to be transmitted to said first input of said second amplifier and said third and fourth legs, as coupled by said balancing impedance, conducting a second component of said signal to be transmitted to said second input of said second amplifier means whereby said first and second components of said signal to be transmitted are of substantially equal amplitude and phase and are therefore canceled in said second amplifier means, said first and third legs and said balancing means providing a conduction path for said signal received from the data channel and said second and fourth legs conducting unequal components of said signal received from the data channel to the first and second inputs of said second amplifier whereby said signal received from the data channel is output from said second amplifier and is isolated from said signal to be transmitted.

2. Data communication apparatus including a data terminal, a data channel and a data set where the data set connects the data terminal to the data channel, said data set comprising, first amplifier means having an output for providing a signal to be transmitted over the data channel and for isolating the signal to be transmitted from a signal received from the data channel, second amplifier means having first and second differential inputs and having an output, network means including, first, second, third and fourth legs where said first and second legs are connected in series from said output of said first amplifier means to said first input of said second amplifier means, where said third and fourth legs are connected in series from said output of said first amplifier means to said second input of said second amplifier means, connection means for connecting said data channel, having a channel impedance, to said network means at a point between said first and second legs, balancing means including a reactance, forming a balancing impedance equal to said channel impedance, for connecting a reference to said network means at a point between said third and fourth legs, said first and second legs, as coupled by said channel impedance, conducting a first component of said signal to be transmitted to said first input of said second amplifier and said third and fourth legs, as coupled by said balancing impedance, conducting a second component of said signal to be transmitted to said second input of said second amplifier means whereby said first and second components of said signal to be transmitted are of substantially equal amplitude and phase and are therefore canceled in said second amplifier means, said first and third legs and said balancing means providing a conduction path for said signal received from the data channel and said second and fourth legs conducting unequal components of said signal received from the data channel to the first and second inputs of said second amplifier whereby said signal received from the data channel is output from said second amplifier and is isolated from said signal to be transmitted.

3. The apparatus of claim 2 wherein said first, second, third and fourth legs each includes a resistor and wherein said reactance in said balancing means is a capacitor.

4. The apparatus of claim 3 wherein said third leg includes a resistor having a variable tap and wherein said balancing means includes a capacitor connecting said variable tap to said reference, said variable tap being adjustable to make said balancing impedance equal to said channel impedance.

5. The apparatus of claim 2 wherein said connection means includes a transformer which dc isolates said network means from said data channel.

6. The apparatus of claim 2 wherein said data set includes means for generating said signal to be transmitted in response to digital data.

7. The apparatus of claim 6 wherein said means for generating includes a frequency shift keyed oscillator for generating said signal to be transmitted as a frequency shift keyed signal.

8. The apparatus of claim 2 wherein said data set includes filter means connected to said output of said second amplifier means for detecting a plurality of frequencies within the signal received from said data channel to form a multifrequency received signal.

9. The apparatus of claim 8 wherein said filter means includes high-band means for detecting a high band of frequencies within said received signal to form a high-band signal and low-band means for detecting a low band of frequencies within said received signal to form a low-band signal.

10. The apparatus of claim 9 wherein said high-band means includes means for providing a negative cross-coupled high-band signal and wherein said low-band means includes means for providing a negative cross-coupled low-band signal, said high-band means including means for subtracting said negative cross-coupled low-band signal from said received signal wherein said high-band means has a sharp cutoff for distinguishing high-band signals from low-band signals, and wherein said low-band means includes means for subtracting said negative cross-coupled low-band signal from said received signal whereby said low-band means has a sharp cutoff for distinguishing said high-band signal from said low-band signal.

11. The apparatus of claim 8 including a high-band tone detector for detecting discrete frequencies within said high-band signal to form digital high-band signals and including second tone detector means for detecting discrete frequencies within said low-band signal to form digital low-band signals;

encoder means responsive to said high-band and said low-band digital signals to form encoded digital signals.

12. The apparatus of claim 11 including converter means for converting said encoded digital signals to a parallel digital code and incuding parallel-to-serial converter means for converting said parallel digital code to a serial-by-bit digital representation.

13. The apparatus of claim 2 wherein said first and second amplifier means each includes a differential-voltage operational amplifier and wherein the output from said first amplifier means establishes a virtual ground.

* * * * *